C. S. BARRELL.
SWIVEL DEVICE.
APPLICATION FILED MAR. 20, 1916. RENEWED MAY 21, 1919.

1,358,814.

Patented Nov. 16, 1920.

Inventor:
Charles S. Barrell.
By Henry J. Miller
atty.

UNITED STATES PATENT OFFICE.

CHARLES S. BARRELL, OF BOSTON, MASSACHUSETTS, ASSIGNOR TO BARRELL HOLDING AND MANUFACTURING COMPANY.

SWIVEL DEVICE.

1,358,814.  Specification of Letters Patent.   Patented Nov. 16, 1920.

Application filed March 20, 1916, Serial No. 85,299.  Renewed May 21, 1919.  Serial No. 298,821.

*To all whom it may concern:*

Be it known that I, CHARLES S. BARRELL, a citizen of the United States, residing at Boston, in the county of Suffolk and State of Massachusetts, have invented new and useful Improvements in Swivel Devices, of which the following is a specification, reference being had to the accompanying drawings, forming part thereof.

This invention has reference particularly to improvements in swivel members adapted for use in securing the cross chains of a tire chain to the side chains.

The objects generally of the invention are to provide a securing member of this character which although extremely simple in construction, is highly efficient and is of artistic appearance.

Referring to the drawings:—

Similar numerals of reference designate corresponding parts throughout.

Figure 1:
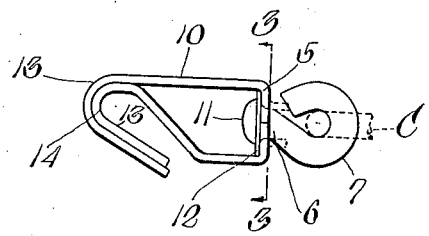
Figure 1, represents a side view in elevation of a securing member embodying my invention.
Figure 2:
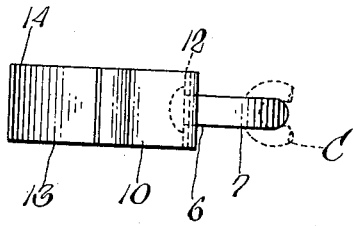
Fig. 2, represents a bottom plan view of the same.
Figure 3:
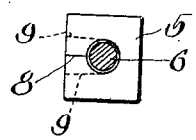
Fig. 3, represents a sectional view taken on the line 3—3 of Fig. 1.

The securing member represented in the drawings is formed of sheet metal having the plate 5 perforated to provide a bearing for the shank 6 of the swivel member 7 at the ends of the cross chain C. Said plate 5 has a slit 8 extending from said perforation to the edge of said plate 5 whereby the adjacent portions of said plate may be bent, approximately on the lines indicated at 9 in Fig. 3, to permit the introduction of the swivel shank 6 in said perforation and may then be bent to place as shown in full lines in Fig. 3. The material extending from the ends of plate 5 is bent to form the box or frame 10 partially inclosing the head 11 on the end of the swivel shank 6 and its hardened bearing seat 12, and the ends 13, 13 of said box member are brought together and bent to form the hook 14 which is adapted to be secured to one of the links L of the side chains.

It will be understood from the foregoing that this securing member may be readily attached and detached when desired, and yet is very strong and durable.

Having thus described my invention I claim as new and desire to secure by Letters Patent.

1. A securing member of the character described provided with an end of malleable metal having an aperture therein and a slit extending from an edge thereof into said aperture, the other end of said securing member adapted to be secured to a side-chain.

2. The combination with a member link provided with a shank having a head, of a securing member provided with an end having an aperture therein and a slit extending from an edge thereof into said aperture to permit the introduction of said shank into said aperture, the other end of said securing member adapted to be secured to a side-chain.

3. The combination with a swivel member provided with a shank having a head, of a securing member provided with an end of malleable metal having an aperture therein encircling said shank, and a slit extending from an edge of said end into said aperture, a bearing plate between said head and said end, the other end of said securing member adapted to be secured to a side chain.

4. A securing member of the character described formed of sheet metal bent to form a square plate at one end, and the ends of said sheet metal brought together and bent into a hook, said square plate provided with an aperture adapted to receive the shank of a swivel member.

5. A swivel securing member of the character described comprising a sheet metal element bent to constitute a frame having parallel arms spaced apart and an end having a bearing, the ends of said arms brought together in contact and bent to constitute a hook, and an eye member having a shank journaled in the bearing of said frame and having a head within said frame.

6. The combination with a member having a head, of a member of malleable metal having a flat surface having an aperture therein and a slit extending from said aperture, said malleable member bent to constitute a clearance around the head of said swivel member, and a comparatively hard bearing for said head located in said clearance.

7. A securing member comprising a portion intermediate the ends thereof having an eye therein, and portions projecting from said intermediate portion and toward each other into superposed contacting relation, the terminals of said projecting portions being bent back toward said intermediate portion to form a hook.

8. The combination with a swivel member having a head, a shank and an end portion bent around toward said shank to form an eye, of a securing member formed of sheet metal having a portion provided with an aperture receiving said shank and a hook portion projecting from said aperture portion.

9. The combination with a swivel member, of a securing member formed of a ribbon-like strip having a portion with an aperture therein receiving said swivel member and a hook portion projecting from said aperture portion.

10. The combination with a swivel member having a head, a shank and an eye, of a metal ribbon securing member having a portion intermediate the ends thereof provided with an aperture receiving the shank of the swivel member, and hook portions projecting from said apertured portion into superposed contacting relation, the terminals of said projecting portions being reversely bent to present a hook, and a bearing member having an aperture receiving the shank of the swivel member and interposed between the head of the latter and the securing member.

CHARLES S. BARRELL.